United States Patent [19]

Watanabe

[11] Patent Number: 4,457,659
[45] Date of Patent: Jul. 3, 1984

[54] ARTICLE EXCHANGE APPARATUS
[75] Inventor: Akira Watanabe, Kyoto, Japan
[73] Assignee: Mitsubishi Jukogyo Kabushiki Kaisha, Japan
[21] Appl. No.: 371,955
[22] Filed: Apr. 26, 1982
[30] Foreign Application Priority Data
  Apr. 30, 1981 [JP] Japan ................ 56-66284
[51] Int. Cl.³ ........................ B65G 47/90
[52] U.S. Cl. ................ 414/223; 414/225; 414/744 A; 29/568
[58] Field of Search ............ 414/222–225, 414/744 A, 590, 736; 29/568

[56] References Cited
U.S. PATENT DOCUMENTS
3,630,391 12/1971 Wilson .............. 414/744 A
4,027,767 6/1977 Gluck ................ 414/223
4,072,236 2/1978 Nomura et al. ......... 414/744 A X Primary Examiner—Leslie J. Paperner
Assistant Examiner—Terrance L. Siemens
Attorney, Agent, or Firm—McGlew and Tuttle

[57] ABSTRACT

An article exchange apparatus which can be used in an auto-loader having an exchange arm, an automatic tool exchange apparatus of a machine tool and the like, comprises an indexing mechanism constructed of a prime mover and a plurality of follower units. The apparatus also includes a mechanism for effecting intermittent indexing operations alternately at the plural follower units in response to a rotational drive of the prime mover. A hydraulic circuit is coupled to the prime mover for imparting such a rotational drive thereto, which is necessary for one cycle of a predetermined operational sequence. The prime mover is coupled to each of the follower units so that, with rotation of the prime mover, one of the units is rotated while the other is held fixed. During one full cycle, each of the follower units executes two indexing motions and has two pause cycles. The apparatus also includes a chuck for gripping an article which is engageable with each of the follower units for rotating the chuck and opening and closing the chuck. A first one of the follower units during the latter half of a first indexing movement thereof, closes the chuck and an arm carring the chuck and also forming part of the apparatus is raised during the first indexing movement of the other follower unit. The arm is rotated by the second indexing movement of the first follower unit. The arm is then lowered by the second indexing term of the other follower unit where upon the chuck is opened during the first half of the first indexing movement of the first follower unit.

5 Claims, 19 Drawing Figures

FIG. 6a
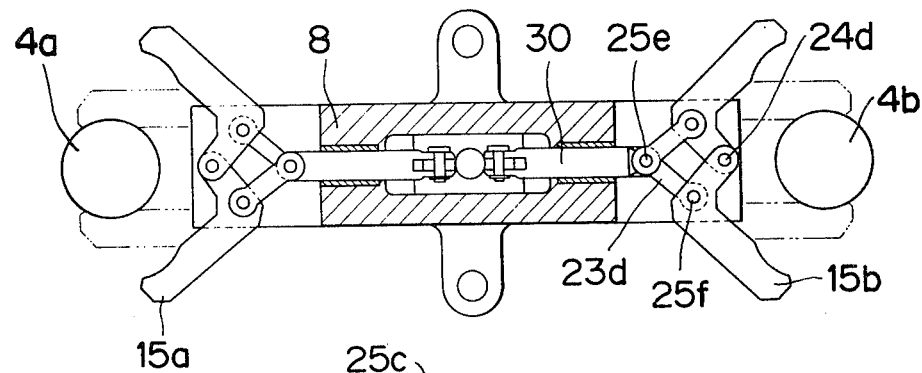
FIG. 6b
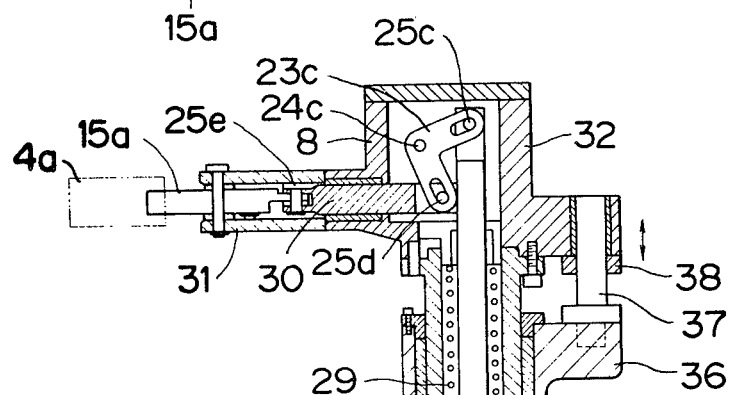
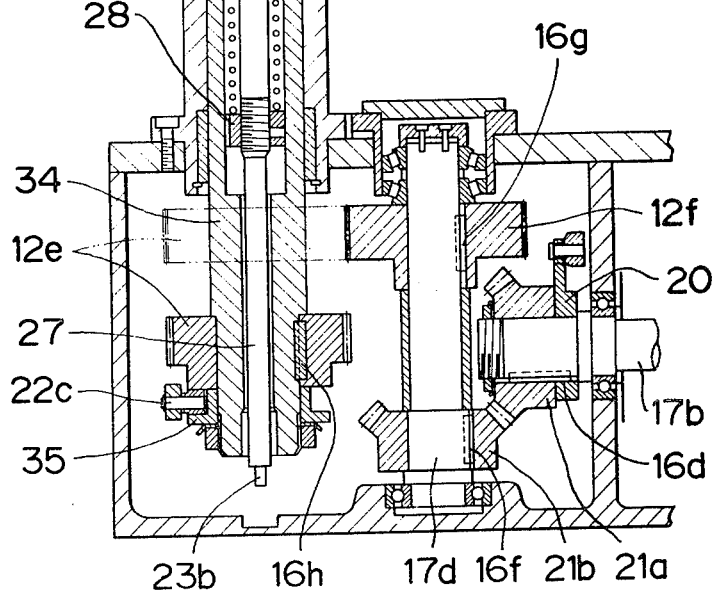

ARTICLE EXCHANGE APPARATUS

FIELD AND BACKGROUND OF THE INVENTION

The present invention relates to an article exchange apparatus which can be used in an auto-loader having positioning and clamping functions, an auto-loader having an exchange arm, or an automatic tool exchange apparatus of a machine tool.

A conveyor system of a machine tool is known which functions to convey a workpiece from its storage or standby position to its machining position. The machine tool is a clamp or fixture for positioning the workpiece at its correct machining position and for fixing the workpiece so reliably as to allow the workpiece to endure a cutting force during the machining operation. The workpiece is usually positioned, in advance, at its storage or stand-by position. Therefore, a series of fundamental operations are required to simultaneously chuck the workpiece at its storage or stand-by position and chuck a workpiece that is fixed by the aforementioned fixture, to exchange the two workpieces, and then to unload the workpiece which has been machined. That is to say, the following three operational elements are required:

(1) to chuck and unload a workpiece;
(2) to extract another workpiece from its stand-by position and to load the other workpiece; and (3) to exchange the workpieces.

Moreover, these fundamental operations are performed by using respective drive sources, which usually utilize hydraulic or pneumatic pressure. The aforementioned respective drive sources are controlled by electromagnetic change-over valves, which are coupled to such signal generators, e.g. limit switches for detecting the operational ends of the respective movements, as are disposed in a sequence circuit for controlling the respective operations in a predetermined order so that the electromagnetic change-over valves are controlled by the signals of these signal generators.

However, the control method thus far described frequently has a timer disposed in the sequence circuit so that a predetermined locus of movement may not be missed when interchange takes place from one operation to a subsequent operation or so that the reception of the signals of the signal generators may be stabilized to reduce shocks during the starting or stopping of movements. Moreover, it is customary to use a speed adjustor to mechanically weaken such shocks. As a result, the timer of the speed adjustor governs the time period for the series operations of the auto-loader. This causes a problem in that the operating time period (i.e. the non-cutting time period) cannot be made shorter than a predetermined level.

Furthermore, the limit switch and the drive source are frequently mounted on a movable unit, so that wiring and fluid conduits to those apparatus have to be made extendible or rotatable. This raises a further problem in that of damage to such wiring and conduits, due to shock generated by the series operations or by repetition of movement, is increased. This degrades the reliability of the system as a whole.

SUMMARY OF THE INVENTION

The present invention contemplates the elimination of aforementioned problems and a shortening of the non-cutting time period so as to enhance the machining efficiency of a machine tool. It is an object of the present invention to provide an article exchange apparatus which is constructed of a purely mechanical type mechanism, for promptly and reliably exchanging the workpieces. This is based on the recognition that the non cutting time period has to be shortened as much as possible where the time period for machining one workpiece is short. According to a feature of the present invention, an article exchange apparatus includes indexing means, which are constructed of a prime mover and a plurality of follower units, the indexing means having a mechanism for effecting intermittent indexing operations alternately at the plural follower units in response to a rotational drive of the prime mover. A hydraulic circuit is coupled to the indexing means for imparting this rotational drive to the prime mover for each single cycle of a predetermined operational sequence.

The present invention will now be described in connection with the embodiments thereof and reference to the accompanying drawings.

BRIEF DESCRIPTION OF THE DRAWINGS

In the drawings:

FIG. 6a is a sectional view taken along line VI—VIa of FIG. 2;

FIG. 6b is a sectional view taken along line VIb—VIb of FIG. 3;

DESCRIPTION OF THE PREFERRED EMBODIMENTS

Figure 1:
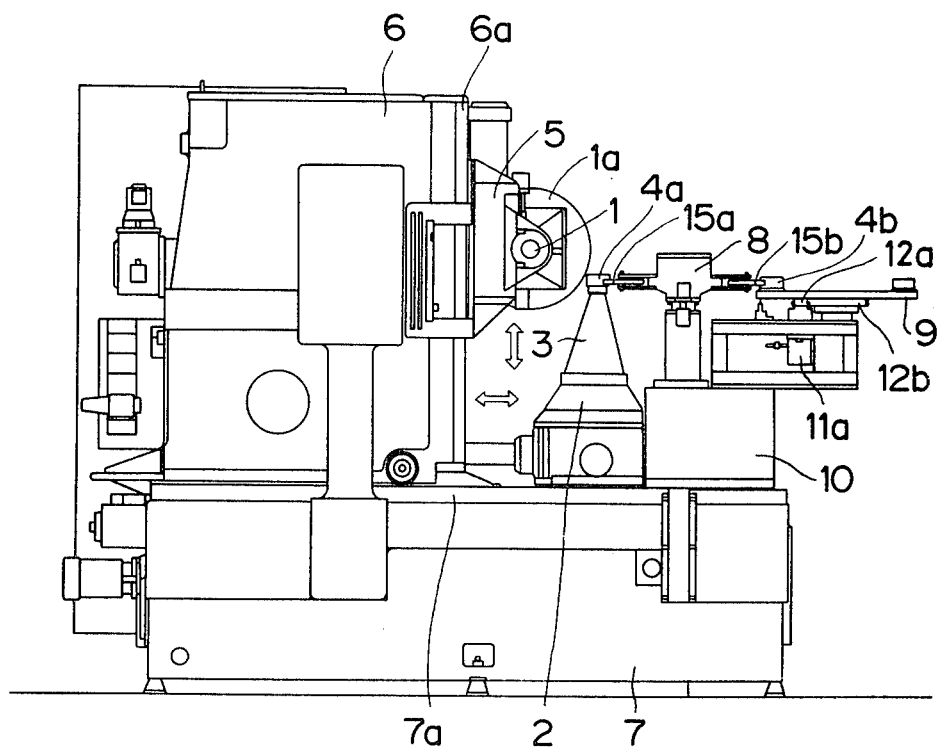
FIG. 1 is a front elevational view of a hobbing machine according to a first embodiment of the present invention.
Figure 2:
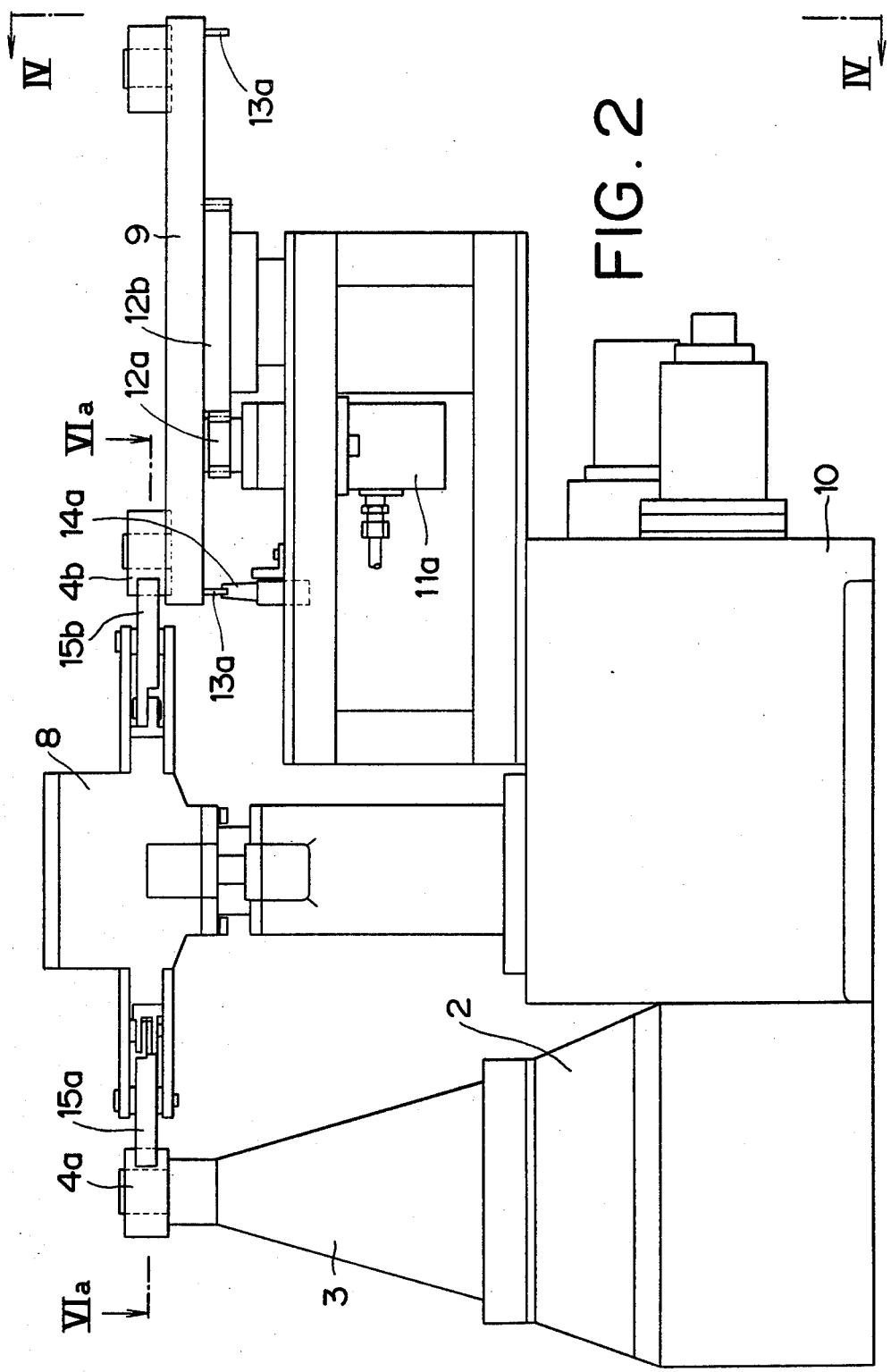
FIG. 2 is an enlarged front elevational view of an auto-loader unit for the hobbing machine of FIG. 1.

Referring first to FIGS. 1 to 4, a hobbing tool 1a is shown attached to a hob spindle 1. The tool 1a is rotated at a predetermined ratio to a workpiece 4a which is clamped by a clamp 3 of a rotary table 2, so that tool 1a may hob the workpiece 4a by a generating process to form gear teeth on the outer circumference of the workpiece 4a. The hob spindle 1 is mounted in a saddle 5 which is vertically movably mounted on a sliding portion 6a of a column 6, which in turn is so placed on a sliding portion 7a of a bed 7, that spindle 1 be brought close to the rotary table 2. An exchange arm 8 is used to exchange a workpiece 4b, on a workpiece storage magazine 9, with workpiece 4a in the clamp 3. A drive mechanism 10 for exchange arm 8 is fixedly placed on the bed 7.

The magazine 9 is rotationally driven by a hydraulic motor 11a through gears 12a and 12b. When a limit switch dog 13a (shown in FIG. 2) corresponding to the position of the workpiece 4b on the magazine 9 contacts with a limit switch 14a, the rotation of the hydraulic motor 11a is stopped to effect a positioning operation. The workpieces 4b on the magazine 9 are thus consecutively hobbed or machined, and each workpiece which has been machined can be exchanged with a workpiece to be machined, by the action of the exchange arm 8.

Figure 3:
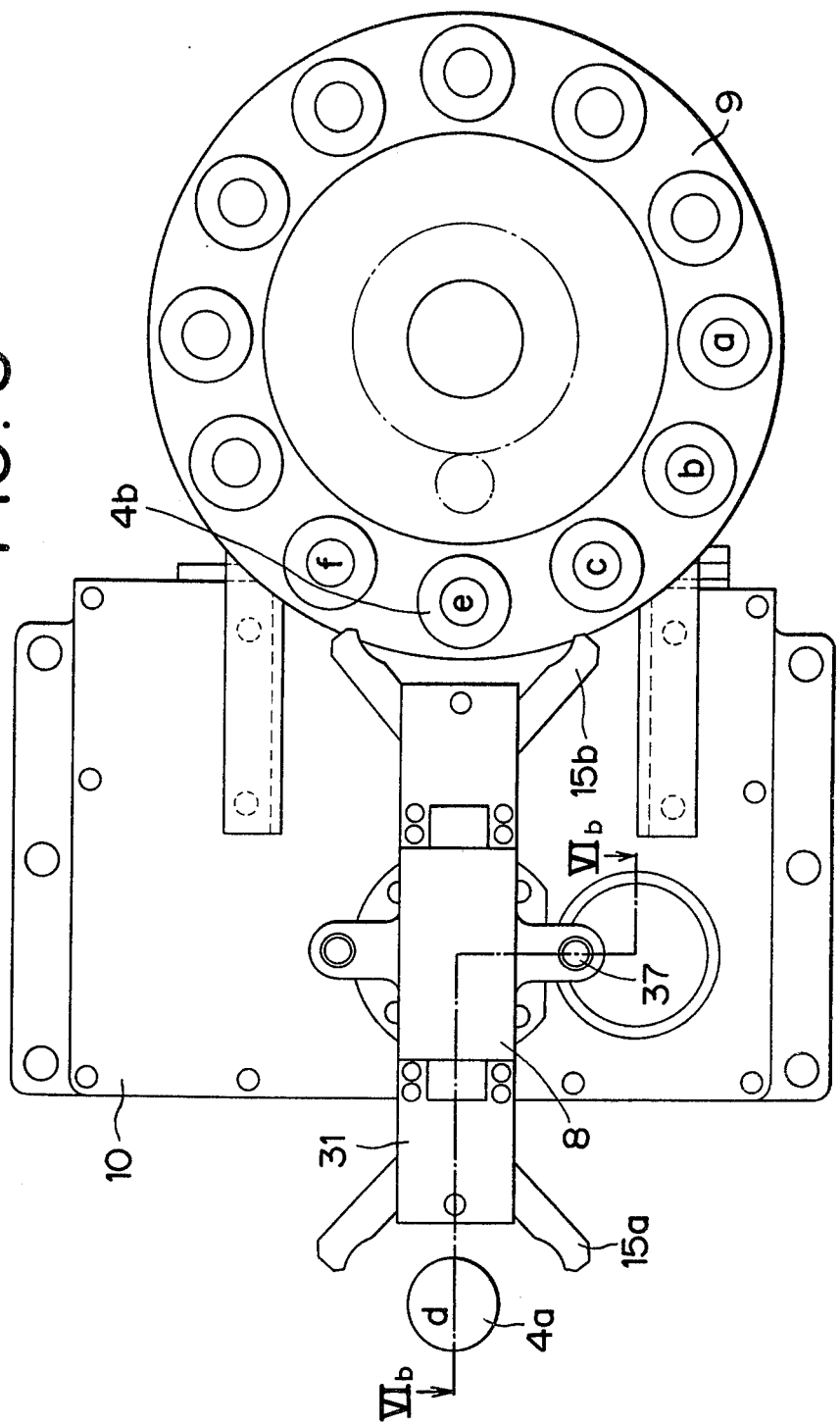
FIG. 3 is a top plan view of the structure of FIG. 2.

In FIG. 3, reference letters a, b and c indicate workpieces which have been hobbed, letter d indicates the workpiece now being hobbed which is clamped by the clamp 3, letter e indicates the workpiece to be subsequently hobbed, and letter f indicates the workpiece to be hobbed next after the workpiece at e has been hobbed. When the machining operation of the workpiece d being hobbed is finished, the exchange arm 8 simultaneously clamps the workpieces 4a (d) and 4b (e) by its chucks 15a and 15b, and exchanges them.

Figure 9:
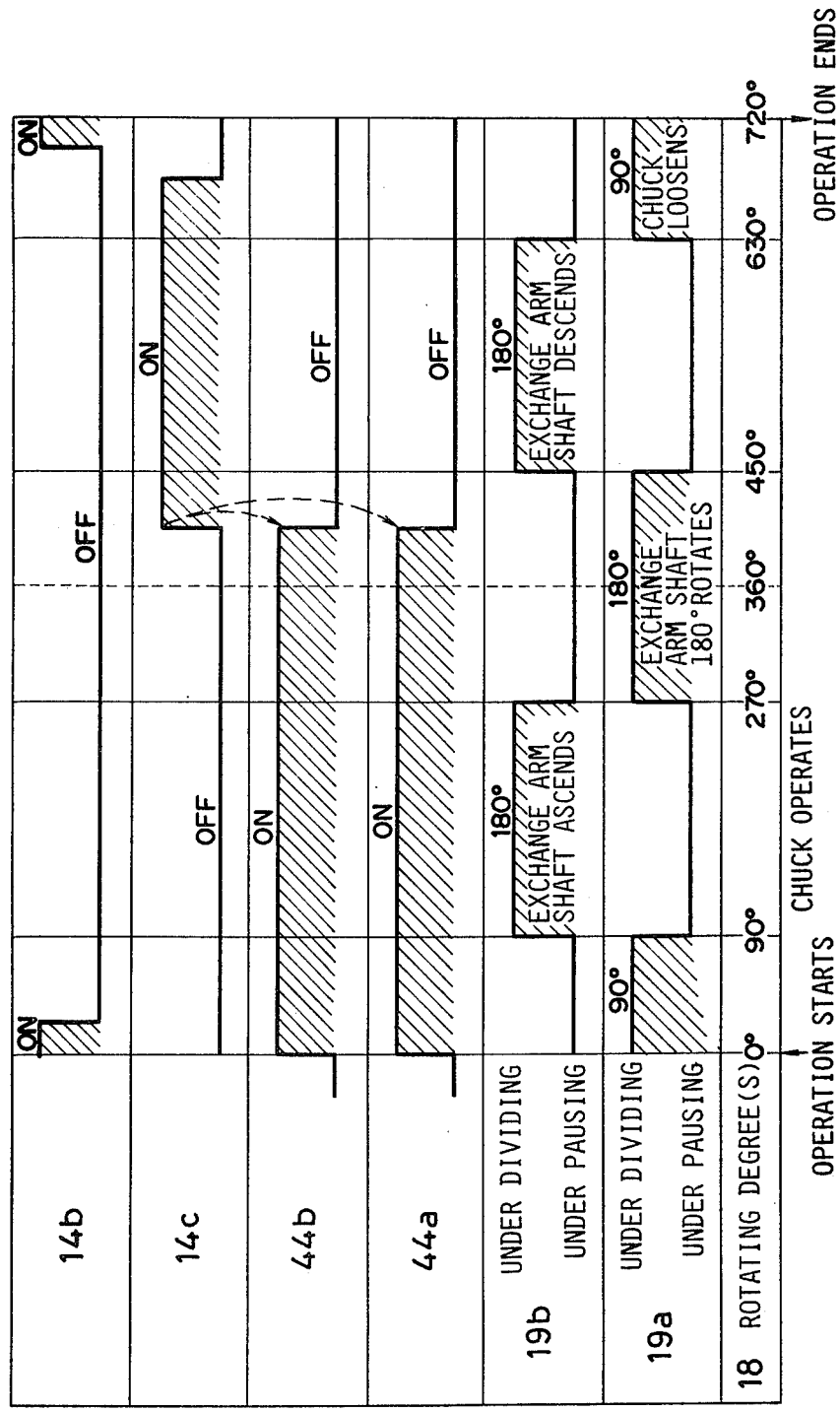
FIG. 9 is a diagram showing the respective operational sequences of the present invention.

With reference to FIGS. 5, 6a, 6b, 7a and 7b, the drive mechanism 10 includes indexing means having a prime mover 18 mounted on a shaft 17a, which is connected to another hydraulic motor 11b through a key 16a, gears 12c and 12d and a key 16b. Prime mover 18 has a pair of cams, one for each of two follower units to be described. The indexing means includes two follower units (I) and (II) designated 19a and 19b in FIG. 5, which are intermittently indexed or rotated by 180° in response to two rotations of the prime mover 18 so that a series of the following sequential operations can be effected (as shown in FIG. 9) by their respective single rotations:

(1) the clamping of the workpiece;
(2) the lifting of the workpiece;
(3) the exchanging of the workpiece;
(4) the lowering of the workpiece; and
(5) the unloading of the workpiece.

Figure 4:
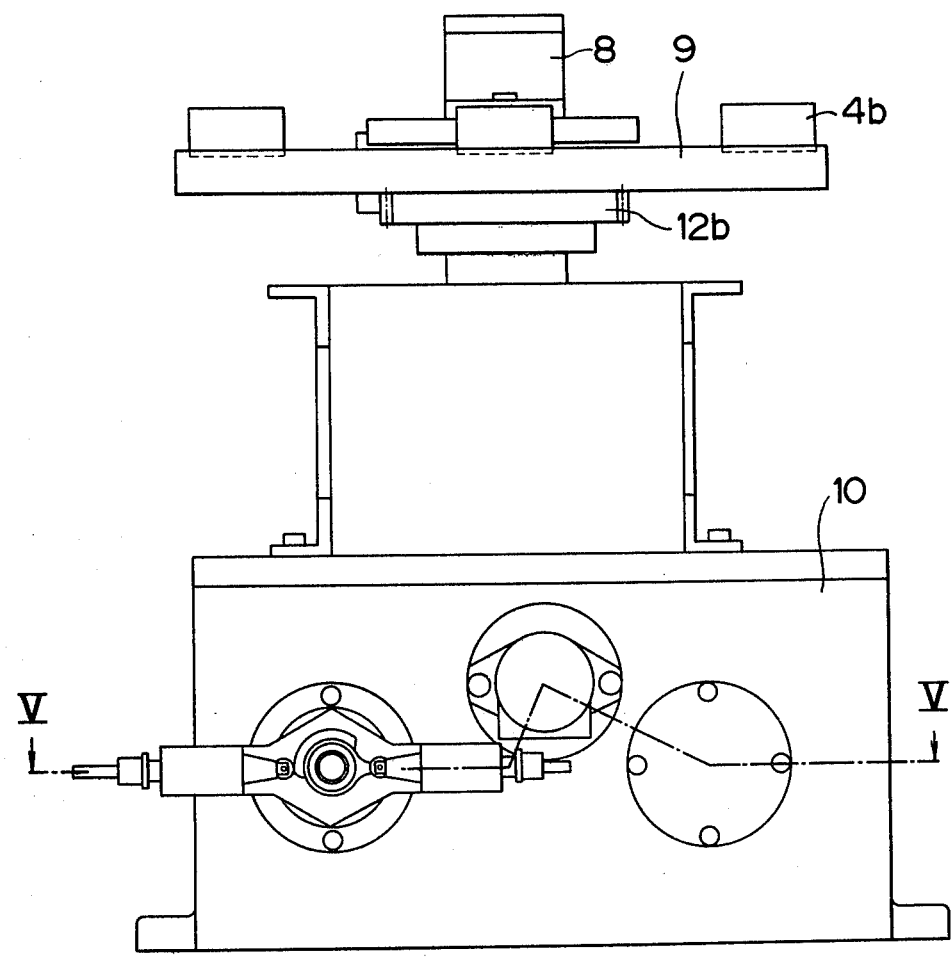
FIG. 4 is a side view taken along line IV—IV of FIG. 2.
Figure 5:
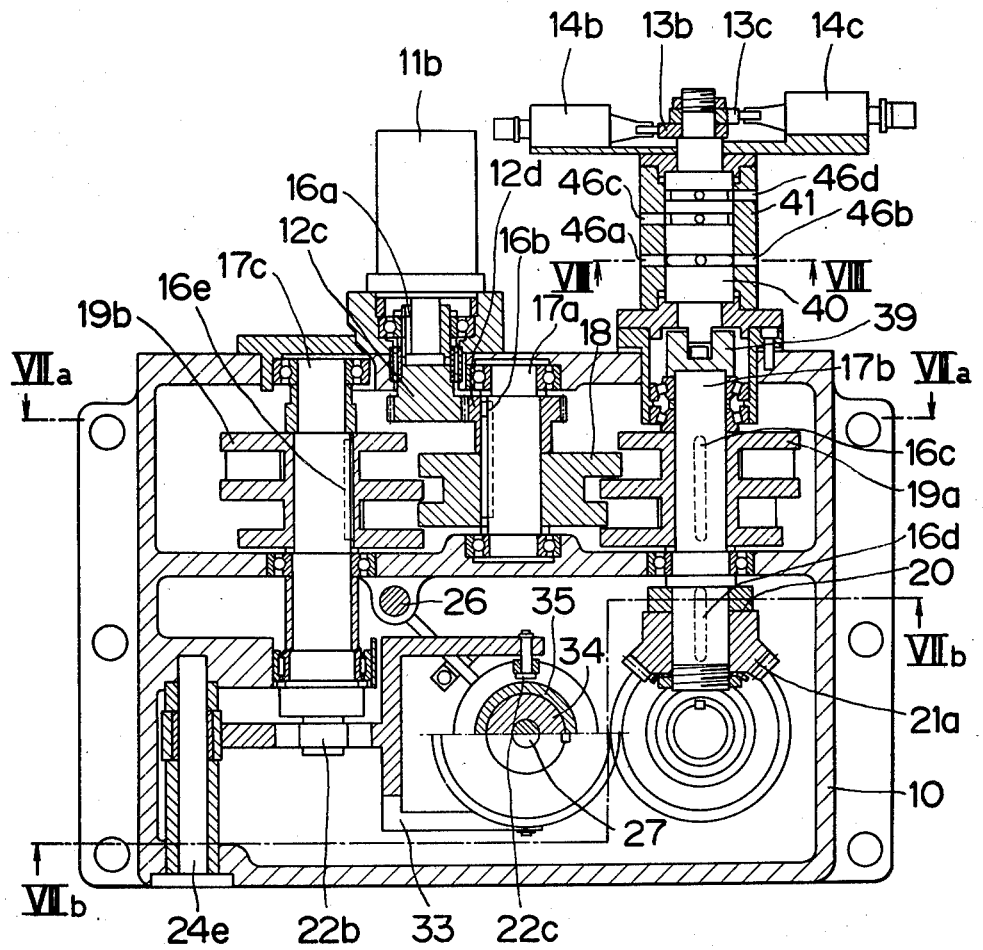
FIG. 5 is a sectional view taken along line V—V of FIG. 4.

FIG. 5 is a sectional view taken along line V—V of FIG. 4 and shows the internal construction of the drive mechanism 10. As FIG. 15, limit switch dog 13b and 13c are connected to a rotary valve stem 40 and are positioned to activate and origin configuration limit switch 14b and a half-cycle detection limit switch 14c, respectively. Follower unit 19a is connected non-rotatably with shaft 17b by key 16c. Shaft 17b also carries a cam 20 and bevel gear 21a which is non-rotatably connected to the shaft by key 16d. Shaft 17b is coupled to valve stem 40 by a cup ring 39. Valve stem 40 rotates within a valve housing 41 having fluid passages 46a through 46d.

The other follower unit 19b is non-rotatably mounted on shaft 17c by key 16e. A fulcrum 24e is fixed to the housing of drive mechanism 10 and pivotably carries a lever 33. A cam 22b is connected to the bottom of shaft 17c and rides in slot in lever 33. Rotation of shaft 17c causes lever 33 to rock up and down (in a plane perpendicular to FIG. 5) on fulcrum 24e.

Lever 33 has an arm at its end carrying a cam follower 22c. The cam follower 22c rides in a groove of an exchange arm shaft 34 defined by a collar 35 of the exchange arm shaft. A guide bar 26 is axially movable in the housing of mechanism 10 and a draw bar 27 is axially movable within shaft 34.

Figure 7A:
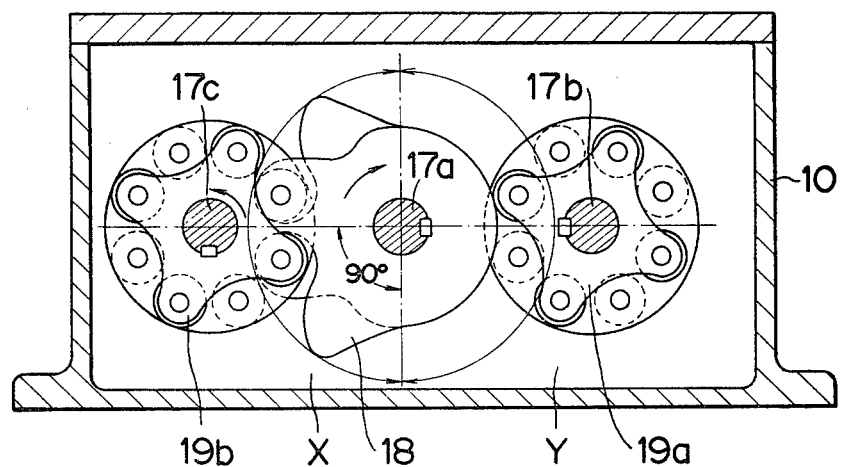
FIG. 7a is a sectional view taken along line VIIa—VIIa of FIG. 5.

The relationship between the index positions of the aforementioned follower units (I) and (II), that is 19a and 19b, respectively will be described with reference to FIG. 7a.

When the hydraulic motor 11b is operated, its rotational drive is imparted to the prime mover 18 of the indexing means through the key 16a, the gears 12c and 12d, the key 16b and the shaft 17a, and the follower units 19a and 19b are intermittently indexed in an alternating manner by the prime mover 18. Such a relationship is set, as shown in FIG. 7a, that over each full rotation (360°) of the prime mover 18, one half angle of 180° is assigned to an index section X for indexing the follower unit (I) or (II), that is 19a or 19b, by 180°, whereas the remaining half angle of 180° is assigned to a pause section Y. As a result, if the follower units 19a and 19b are arranged at an angular spacing of 180° with respect to the prime mover 18, as shown in FIG. 7a, they can alternate their indexing and pausing operations for the rotations of the prime mover 18, i.e. they can maintain a relationship in which one is being indexed whereas the other is experiencing a pause. FIG. 7a shows this positional relationship of the indexing means at the start and end points of the mechanism under consideration. The prime mover 18 stops the follower unit (II) 19b during the indexing operation of the follower unit (I) 19a, with the prime mover 18 is rotated by 180° in the direction of the arrow from the position of FIG. 7a.

Now, before the aforementioned mechanism is explained further, it is assumed for simplicity of explanation that the starting position of mover 18 is effected at the center of the index angle of 180° of the prime mover 18 (as shown in FIG. 9).

Figure 7B:
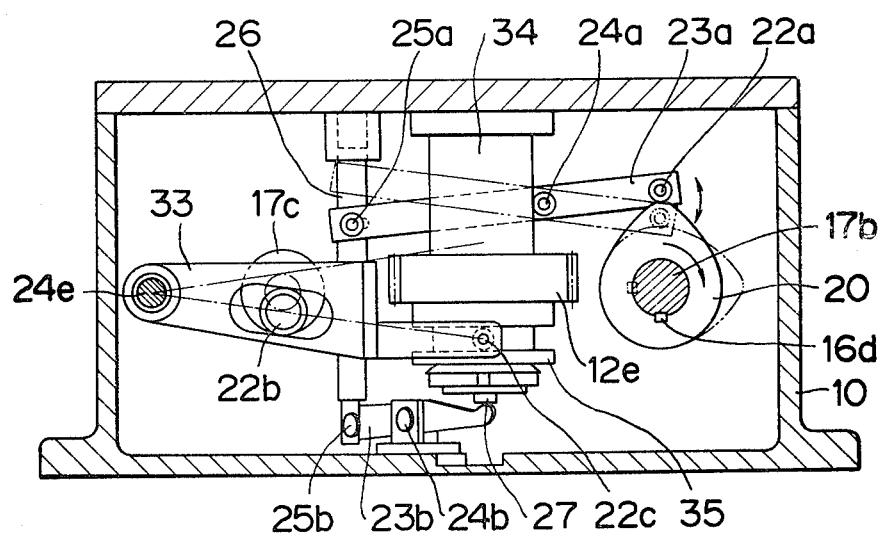
FIG. 7b is a sectional view taken along line VIIb—VIIb of FIG. 5.

When the hydraulic motor 11b is rotated from that starting position, the follower unit (I) 19a starts to rotate so that the shaft 17b is rotated through the key 16c. Referring to FIG. 7b, since the cam 20 and the bevel gear 21a are attached to the shaft 17b through the key 16d, a cam follower 22a contacting with the cam 20 can be lowered or rotated, when the cam 20 rotates 90 degrees, clockwise about a fulcrum 24a, together with a link 23a. Follower 22a thus moves downwardly so that the guide bar 26 is slid upwardly by the action of a pin 25a connected thereto. As a result, a pin 25b and a link 23b are rotated clockwise about a fulcrum 24b so that the draw bar 27 is moved downwardly.

In FIG. 7b, reference characters 12e indicates the gear of the exchange arm shaft 34.

The draw bar 27 is biased downwardly, as shown in FIG. 6b, by the action of a spring 29 through a nut 28. As a result, when the link 23b is lowered, the restriction on the draw bar 27 is removed so that the draw bar 27 is moved down by the force of the spring 29. By this movement of the draw bar 27, a push rod 30 is threaded outwardly, as shown in FIG. 6a, a chuck 15b is closed about a fulcrum 24d through a pin 25e, a link 23d and a pin 25f thereby to clamp the workpiece 4b. These respective members, e.g. the aforementioned pins 25e and 25f, link 23d and fulcrum 24d are accommodated in a case 32 having a plate 31 and forming part of the exchange arm 8. Chuck 15a is closed in the same way.

In FIG. 6b, a housing which encloses part of the shaft 34 also indicates a post 36, one which is mounted a positioning pin 37. Case 32 has a guide bushing 38 for slidably receiving pin 37. A gear 12f of a shaft 17d is connected by key 16g. A key 16f of the same shaft 17d fixed a bevel gear 21b. A key 16h of the exchange arm shaft 34 fixed gear 12e thereto.

Next, the operations for lifting the exchange arm shaft 34 so as to lift the workpiece will be described.

With reference to FIGS. 5, 7b and 9, as the follower unit (I) 19a is indexed by 90° by the first rotation of 90° of the prime mover 18 thereby to close the chuck 15b, it is brought into its pause section, whereas the other follower unit (II) 19b starts to rotate 180°. As shown in FIG. 5, this follower unit (II) 19b transmits its rotation through the key 16e to the shaft 17c so that the cam follower 22b eccentrically attached to the end face of the shaft 17c, is turned by this rotation. The cam follower 22b is fitted in the lever 33, as shown in FIG. 7b, so that the lever 33 is raised about the fulcrum 24e by the rotation (up to its top dead center) of 180° of the cam follower 22b. To one end of the Lever 33 sandwiches the shaft 34 of the exchange arm 8 and has two of the cam followers 22c which are fitted between the gear 12e and the collar 35 (only one showing in FIG. 5). As a result, the exchange arm shaft 34 is lifted by the cam follower 22c in response to the rise of the lever 33.

At the upper end of the exchange arm shaft 34, as shown in FIG. 6b, the positioning pin 37 mounted in the post 36 is fitted in the guide bushing 38 of the case 32, which is jointed to the exchange arm shaft 34, thereby to position that shaft 34 in the rotational direction. As a result, when the exchange arm shaft 34 is lifted, the gears 12e and 12f are brought into meshing engagement, and the guide bushing 38 comes out of the positioning pin 37 so that motion in the rotational direction of the exchange arm shaft 34 is restricted by the gear 12f.

Next, the exchange of the workpieces 4a and 4b will be described with reference to FIGS. 6b and 9.

After the follower unit (II) 19b has rotated 180°, it is brought into its pause state, whereas the other follower unit (I) 19a starts its rotation. This rotation is transmitted, as shown in FIG. 6b, from the shaft 17b through the key 16d, the bevel gears 21a and 21b, the key 16f, the shaft 17d and the key 16g to the gear 12f. Since the exchange arm shaft 34 is in its uppermost position however, the gears 12e and 12f are in meshing engagement and are rotationally driven by the follower unit (I) 19a thereby to rotate the exchange arm shaft 34 180° through the key 16h. By these operations, the workpieces 4a and 4b are exchanged.

Next, the descending operation of the workpiece will be described with reference to FIGS. 6b, 7b and 9.

When the follower unit (I) 19a pauses whereas the other follower unit (II) 19b starts its rotation, the cam follower 22b moves from its top dead center to its lower dead center so that the lever 33 is moved down to lower the exchange arm shaft 34. At this time, the gear 12e of the exchange arm shaft 34 comes out of engagement with the gear 12f, another bushing (not shown) at a position opposite bushing 38 by 180°, comes into engagement with the positioning pin 37 thereby to rotationally position shaft 34 in its lower most vertical position.

The unloading or open operation of the workpiece is performed in the following manner.

When the follower unit (II) 19b pauses and when the other follower unit (I) 19a finishes its final rotation of 90°, the cam 20 has already conducted its rotation of 360° by summing its first rotation of 90° and the rotation of 180° of the exchange arm shaft 34. The apex of the cam 20 raises the cam follower 22a and the draw bar 27 through the link 23a, pin 25a, the guide bar 26, the pin 25b and the link 23b so that the chuck 15b is opened to unload the workpiece 4b.

Next, the mechanism for automatically effecting a stopping at a predetermined (i.e. end) position in response to the two rotations of the prime mover 18 and the one rotation of the follower unit (I) 19a will be described in the following with reference to FIGS. 5 and 8a to 8d.

The follower unit (I) 19a is required to conduct one rotation during the one cycle of the auto-loader and to pause at the center (after it has rotated 90°) of the index section X. For these requirements, the follower unit (I) 19a is so jointed to the rotary valve stem 40 through the key 16c, the shaft 17b and the cup ring 39 that it can rotate together. The rotary valve stem 40 is accommodated in the housing 41, such that it has its grooves 45a and 45b communicating with the fluid passages 46a to 46d of the housing 41, as shown in FIGS. 8a to 8d.

In FIGS. 8a to 8d, reference characters 42a and 42b indicate the vanes of the rotary valve stem 40 which can close the fluid passages. Stem 40 has a righthand hole 43a and a lefthand hole 43b therein. A hydraulic pressure supply valve 44a (e.g. an electromagnetic valve) is connected to the rotary valve and a hydraulic motor pressure supply valve 44b is also connected to the rotary valve.

Figure 8A:
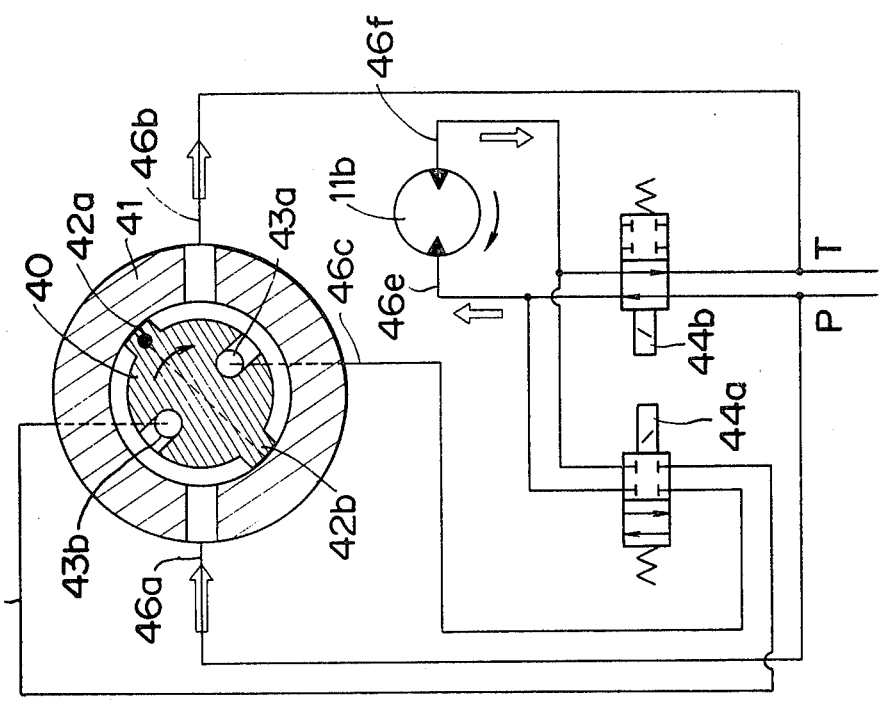
FIGS. 8a to 8d are sectional views taken along line VIII—VIII of FIG. 5, showing different positions through one cycle of the auto-loader unit.

FIG. 8a shows the position for starting the cycle of the auto-loader. The housing 41 has its passage 46a and 46b connected to a hydraulic pressure return side (i.e. a side P) and a hydraulic pressure return side (i.e. a side T), respectively. Moreover, the housing 41 has its passages 46c and 46d connected to the righthand and lefthand holes 43a and 43b of the vane (i.e. the reference point) 42a of the rotary valve stem 40, respectively. These passages 46c and 46d supply the liquid pressure through the electromagnetic valve 44a to the liquid pressure motor 11b. The electromagnetic valve 44b functions as a valve to open and close the circuit which connects the liquid pressure supply and return sides (i.e. at P and T) and the liquid pressure motor 11b. In the case of FIG. 8a, the electromagnetic valve 44b closes that circuit and blocks the communications between the passages 46a and the vane 42a and between the passage 46b and the vane 42b so that the supply of liquid pressure to the liquid pressure motor 11b is stopped.

Figure 8B:
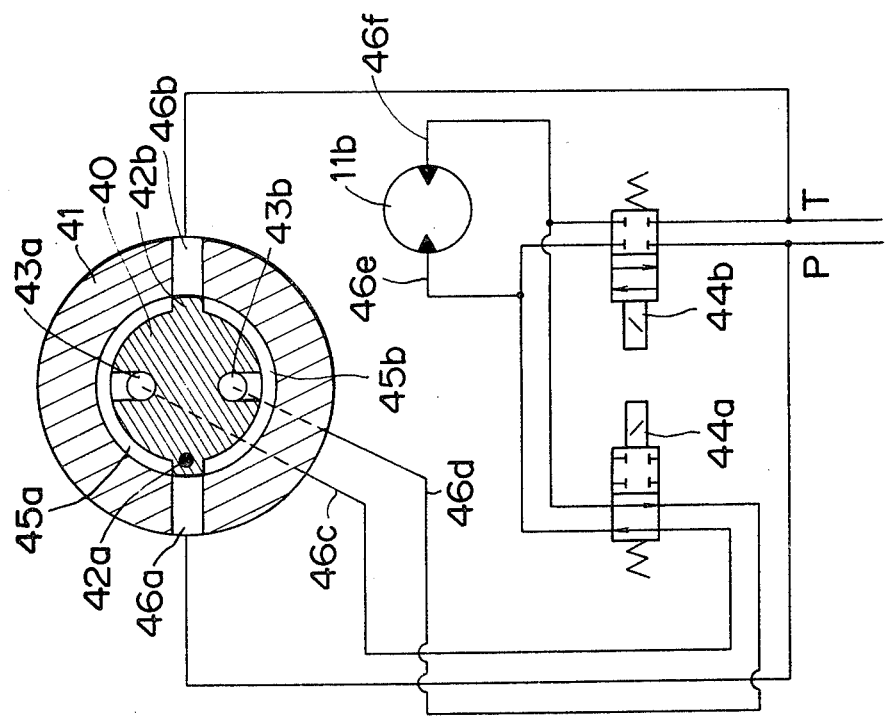

As shown in FIG. 8b, when the electromagnetic valve 44a is energized to close the passages 46c and 46d whereas the electromagnetic valve 44b is energized to open the circuit thereby couple the liquid pressure supply sides (i.e. the P and T sides) to the liquid pressure motor 11b, the liquid pressure is introduced into a passage 46e of the motor and out of a passage 46f of the motor so that the liquid pressure motor 11b is rotated clockwise. This rotation is transmitted to the rotary valve stem 40 through the gears 12c and 12d of the liquid pressure motor 11b, the prime mover 18, the follower unit (I) 19a and the shaft 17b, which together form a mechanical transmission mechanism, so that the rotary valve stem 40 also rotates clockwise.

Figure 8D:
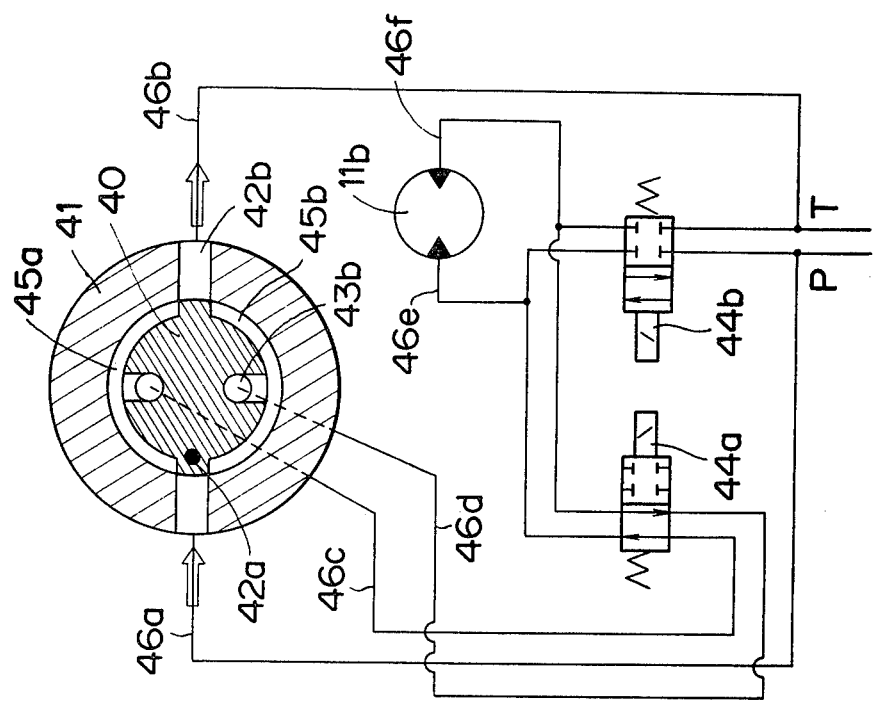
Figure 8C:
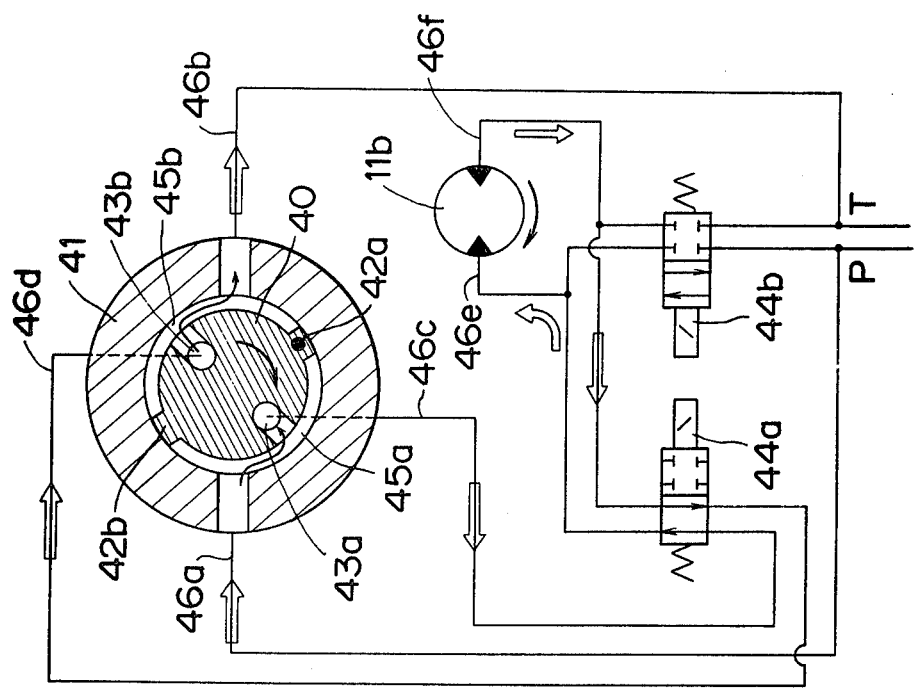

When the rotation is continued past 180°, as shown in FIG. 8c, the vane 42a, i.e. the reference point passes through the passages 46b of the housing 41. If, at this time, the electromagnetic valves 44a and 44b are deenergized, the communications between the passages 46c and 46e and the passages 46d and 46f are provided by the action of the electromagnetic valve 44a, but the liquid pressure supply and return sides (P and T) are blocked by the action of the electromagnetic valve 44b. However, since communication is provided between the liquid pressure supply side (P) and the passage 46a, the liquid pressure is introduced from the passage 46a and transmitted from the groove 45a, which is partitioned by the vanes 42a and 42b, through the hole 43a, the passage 46c and the electromagnetic valve 44a to the passage 46e of the liquid pressure motor 11b in the same direction as that of FIG. 8b until it is further transmitted from the passage 46f through the electromagnetic valve 44a, the passage 46d, the hole 43b and the groove 45b and out of the passage 46b.

The liquid pressure motor 11b and the rotary valve stem 40 continue their rotation, and, when the vanes 42a and 42b block the passages 46a and 46b of the housing 41, respectively, as shown in FIG. 8d, the transmission of the liquid pressure is stopped to stop the supply of liquid pressure to the liquid pressure motor 11b so that the rotation of the motor 11b and the valve stem 40 are stopped by the liquid pressure motor 11b. Even if the rotations are excessive, the liquid pressure is introduced into the groove 45b, which is partitioned by the vanes 42a and 42b, and to propagate out of the groove 45a so that the supply of the liquid pressure to the liquid pressure motor 11b is reversed. As a result, no disadvantage is caused because the liquid pressure motor 11b is reversed to establish the allignments between the vane 42a and the passage 46a and between the vane 42b and the passage 46b, respectively. This relationship is a very important point of the stop mechanism of the present invention.

In short, the one-rotation stop mechanism for causing the liquid pressure motor 11b and the rotary valve stem 40 to rotate more than 180° by the electromagnetic valve 44b and for stopping the rotations of the remaining angle by the use of the circuit connecting the rotary valve stem 40 and the housing 41 is coupled with the one-cycle rotating mechanism of the indexing mechanism (which is constructed of the prime mover 18 and the follower units 19a and 19b) for determining the operational sequence of the auto-loader, whereby it becomes possible to realize a high-speed mechanical type auto-loader.

Moreover, the auto-loader is constructed such that the limit switch dogs 13b and 13c are attached to the rotary valve stem 40 and such that the origin confirmation limit switch 14b is in contact with the dog 13b whereas the half-cycle detection limit switch 14c is in contact with the dog 13c. The aforementioned relationships among the above specified members, the electromagnetic valves 44a and 44b and the indexing mechanism (which includes the prime mover 18 and the follower units 19a and 19b) are illustrated in FIG. 9.

Figure 10A:
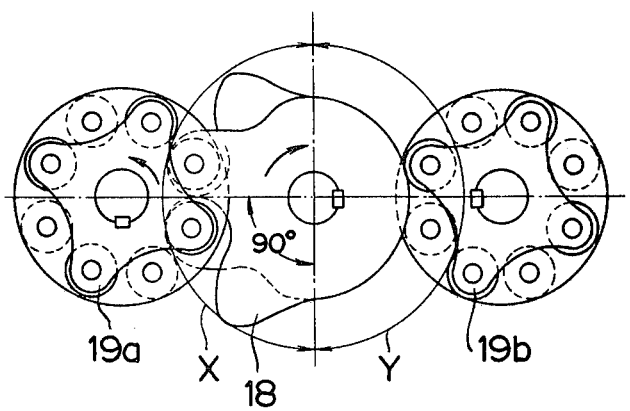
FIG. 10a is a side view of indexing means used in the aforementioned first embodiment of the present invention.
Figure 10B:
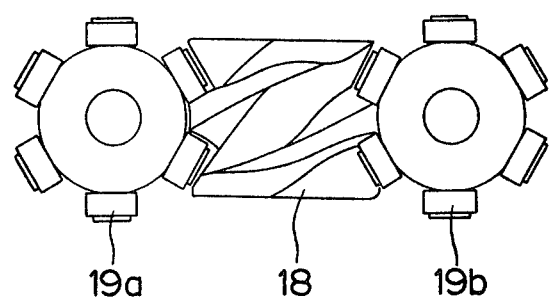
FIG. 10b is a side view of indexing means having a roller gear cam according to another embodiment of the present invention.
Figure 10C:
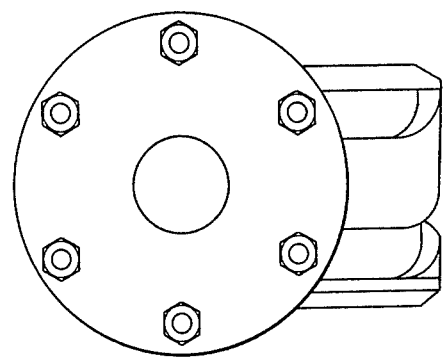
FIGS. 10c and 10d are front elevational and top plan views, respectively, of indexing means using a barrel cam according to still another embodiment of the present invention.
Figure 10D:
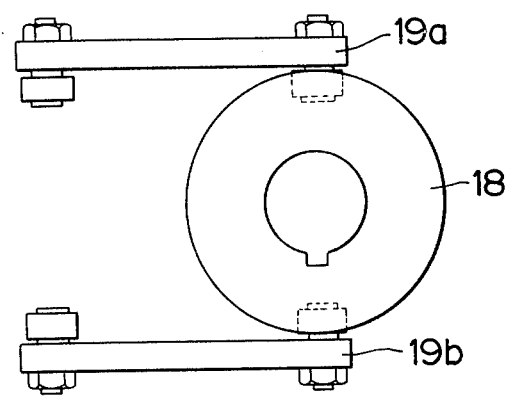

FIGS. 10a to 10d show various examples of indexing means. As shown, the present invention can be applied not only to the aforementioned case (FIG. 10a) of the parallel cam but also to a roller gear cam (as shown in FIG. 10b) and a barrel cam (as shown in FIGS. 10c and 10d). In addition, a Geneva meachanism and another indexing means may also be naturally combined.

Figure 11:
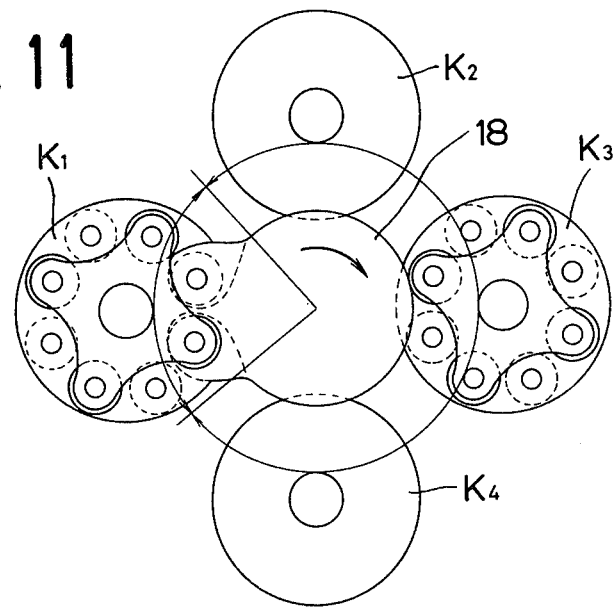
FIG. 11 is an explanatory view showing indexing means according to a still further embodiment of the present invention.

As shown in FIG. 11, moreover, indexing means having four follower units may be used. The general conception of combining units within an allowed space is based upon a calculation wherein, if an N number of follower units are equi-distantly arranged around a prime mover having index sections of an angle of 360°/N and pause sections of an angle of 360° (1−1/N), the operational sequences can be consecutively established. More specifically, if the follower units are indicated at $K_i$ (i=1 to N), it is possible to ensure the sequences of $K_1 \rightarrow K_2 \rightarrow K_3 \rightarrow \cdots \rightarrow K_N \rightarrow \overline{K}_1 \rightarrow \overline{K}_2 \rightarrow \overline{K}_3 \rightarrow \cdots \rightarrow \overline{K}_N$ (wherein $\overline{K}_i$ stands for the reverse operation of $K_i$).

As has been described herinbefore in detail in connection with the embodiments of the invention and with reference to the accompanying drawings, according to the present invention, the workpieces can be exchanged promptly and reliably with a shortening of the non-cutting time period.

I claim:

1. An article exchange apparatus, comprising:
   a prime mover;
   drive means connected to said prime mover to rotate and to stop said prime mover through a plurality of operation cycles; mover for movement by said prime mover during a first and and a second indexing term, and stopable by said prime mover during a first and second stoppage term, for each movement of said prime mover through one operation cycle thereof, said indexing and stoppage terms alternating in time with each other;
   a second follower unit engaged with said prime mover for movement by said prime mover during a first and a second indexing term and stopable by said prime mover during a first and a second stoppage term, for each movement of said prime mover through one operation cycle thereof, said indexing and stoppage terms alternating in time with each other;
   said first and second follower units engaged with said prime mover so that while one of said follower units is in a stoppage term the other of said follower units is in an indexing term, said first indexing term of said first follower unit having a first one half portion and a second one half portion;
   a conveyor arm for moving articles;
   mounting means connected to said conveyor arms for permitting elevating and lowering movement of said conveyor arm and rotation of said conveyor arm;
   a chuck connected to said conveyor arm for movement between an open position for releasing an article at a closed position for gripping an article;
   said first follower unit operatively connected to said chuck for moving said chuck to said open position during said first one half portion of said first indexing term and for moving said chuck to said closed position during said second one half portion of said first indexing term;
   said second follower unit operatively connected to said conveying arm for elevating said conveying arm during said first indexing term of said second follower unit and for lowering said conveyor arm during said second indexing term of said second follower unit; and
   said first follower unit operatively connected to said conveying arm for rotating said conveying arm during said second indexing term of said said follower unit;
   whereby an article can be moved from one location to another location during each operation cycle of said prime mover.

2. An article exchange apparatus according to claim 1 including a housing, said first follower unit comprising a shaft rotatable in said housing, said shaft engaged with said prime mover to rotate 180° for each of said first and second indexing terms, said drive means comprising a fluid motor engaged with said prime mover for rotating said prime mover and fluid pressure means connected to said motor for driving said motor, a first valve connected between said fluid pressure means and said fluid motor for supplying fluid pressure to activate said fluid motor at a beginning of each operation cycle, each operation cycle beginning at the start of said second one half portion of said first indexing term for said first follower unit, a valve stem connected to said first follower unit shaft having a pair of vanes spaced from each other by 180 degrees and having a pair of grooves between said vanes, said valve stem rotatable in said housing and said housing having a pair of fluid passages spaced by 180 degrees over which said pair of vanes pass to close said pair of fluid passages respectively at the beginning of each operation cycle, a second valve connected to said fluid pressure means, said valve stem including a pair of openings each communicating with one of said grooves, said openings connected to said second valve and said pair of fluid passages connected to said fluid pressure means so that, with said first valve moved to a position to stop a flow of fluid to said fluid motor, said second valve permits passage of fluid through said openings, grooves and passages to continue rotation of said valve stem until said first follower unit is rotated to the beginning of said second one half portion of said first indexing term of said first follower unit.

3. An article exchange apparatus according to claim 2 including a limit switch fixed to said housing and a dog connected to said valve stem engagable with said limit switch to activate said limit switch at the end of each operation cycle, said limit switch connected to said first and second valves for opening said second valve and closing said first valve at the end of each operation cycle.

4. An article exchange apparatus according to claim 2 including one rotation stop means connected between said drive means and said prime mover for rotating said prime mover to a position for the beginning of each operation cycle, each operation cycle beginning at the start of said second one half portion of said first indexing term of said first follower unit, said first follower unit engaged with said one rotation stop means for stopping said prime mover at the beginning of each operation cycle.

5. An article exchange apparatus according to claim 4 including a case, said prime mover comprising a shaft rotatably mounted in said case and cam means fixed to and rotatable with said shaft, each of said first and second follower units comprising a shaft rotatably mounted in said case and cam follower means engaged with said cam means of said prime mover for rotating said first and second follower unit shafts during said indexing terms.

* * * * *